Dec. 30, 1969   I. BOKSJÖ ET AL   3,487,261
THYRISTOR CIRCUIT WITH OVER-VOLTAGE PROTECTION
Filed Jan. 2, 1968

INVENTOR.
INGVAR BOKSJO
KARL-ERIK OLSSON
PER SVEDBERG

United States Patent Office 3,487,261
Patented Dec. 30, 1969

3,487,261
THYRISTOR CIRCUIT WITH OVER-VOLTAGE PROTECTION
Ingvar Boksjö and Karl-Erik Olsson, Ludvika, and Per Svedberg, Vallingby, Sweden, assignors to Allmänna Svenska Elektriska Aktiebolaget, Vasteras, Sweden, a Swedish corporation
Filed Jan. 2, 1968, Ser. No. 695,133
Claims priority, application Sweden, Jan. 2, 1967, 9/67
Int. Cl. H05b 37/02, 39/04, 41/36
U.S. Cl. 315—150      5 Claims

ABSTRACT OF THE DISCLOSURE

A thyristor rectifier is characterised in that each individual thyristor in the thyristor rectifier is parallel-connected with its own rapidly igniting protective spark gap and provided with a photo-sensitive control circuit influenced by the raidation from the spark gap.

BACKGROUND OF THE INVENTION

Field of the invention

The present invention refers to a thyristor rectifier for a high voltage current converter which thyristor rectifier comprises a number of series connected thyristors.

The prior art

Just like all other types of metal rectifiers, thyristors are sensitive for over-voltages and especially thyristors for high voltage are sensitive both in the conducting and the blocking direction. Thus if an over-voltage in the conducting direction has great energy the ignition zone in the thyristor will be too small in relation to the rapid increase in current so that local heating occurs in the ignition zone and the thyristor will be destroyed.

In order to protect thyristor rectifiers against over-voltage it is known to parallel-connect the whole thyristor rectifier with some kind of lightning arrester, the flash-over voltage of which is less than the total of the voltage strength of the different thyristors. Such lightning arresters are, however, relatively slow in operation so that a safe protection is only obtained with relatively slowly increasing over-voltages while at the same time as an even voltage distribution along the thyristors of the thyristor rectifier, must be secured. Such ideal conditions could, however, scarcely be expected and especially with over-voltages with a large time derivative there is a great risk that the voltage distribution between the thyristors will be uneven especially if such an over-voltage appears during the normal ignition course of the thyristor rectifier.

SUMMARY OF THE INVENTION

The present invention relates in the first place to the protection of the thyristors against rapidly increasing over-voltages with great energy in the conducting direction but can also to a certain degree protect them against over-voltages in the blocking direction.

A thyristor rectifier according to the invention is characterised in that each thyristor in the thyristor rectifier is parallel-connected with its own rapidly igniting protective spark gap and provided with a photo-sensitive control circuit influenced by the radiation from said protective spark gap. With such a connection the over-voltage in the first place will ignite the protective spark gap whereafter the radiator from this causes an ignition of the thyristor.

If the spark gaps are to be able to offer an effective protection they must be of rapidly igniting type. Such rapidly igniting gaps are normally made as pre-ionised gaps comprising a discharge tube filled with an ionised gas or provided with electrodes enclosing a radioactive material. Such a spark gap is therefore always prepared for a discharge as soon as an over-voltage grows up, contrary to a normal spark gap which first has to be ionised by the over-voltage before a flash-over can arise. Such rapidly igniting discharge tubes have limited conducting ability so that they are not normally able to conduct the whole energy of the over-voltage. This is, however, not necessary since according to the invention the radiation from the tubes ignites the corresponding thyristor so that it may be said that in the first place the spark gaps protect the thyristors whereafter the thyristors are ignied and protect the spark gaps by taking over the great discharge energy. The condition for correct operation thus is that the radiance from the spark gaps is sufficient for safe ignition of the thyristors.

Said mutual protective function exists only with over-voltages in the conducting direction. With over-voltages in the blocking direction the thyristors cannot take over the load from the spark gaps so that these should not normally be ignited at over-voltages in the blocking direction. As mentioned earlier, it is, however, normal to parallel-connect a thyristor rectifier with a lightning arrester the flash-over voltage of which is suitably less than the sum of the flash-over voltages of the series connected protective gaps. Such a lightning arrester, however, cannot prevent a temporary uneven voltage distribution along the thyristor rectifier from possibly igniting some of the protective spark gaps, but only local charges will be discharged through the ignited spark gap while a possible follower current deriving from the voltage over the whole rectifier is small due to the many series-connected elements.

BRIEF DESCRIPTION OF THE DRAWINGS

The invention will be further described with reference to the accompanying drawing in which FIGURE 1 shows a thyristor-rectifier connection for a static converter while FIGURE 1 shows a two-way thyristor rectifier bridge with the pulse number six, comprising six thyristor rectifiers 1–6 each comprising a number of series connected thyristors. The rectifier bridge is provided with AC terminals 7 and DC terminals 8–9. Further, lightning arresters 20 and 21 are shown connected in parallel with two of the rectifiers. Whenever such arresters are used all the rectifiers 1–6 are provided with them.

DESCRIPTION OF THE PREFERRED EMBODIMENTS

Figure 1:
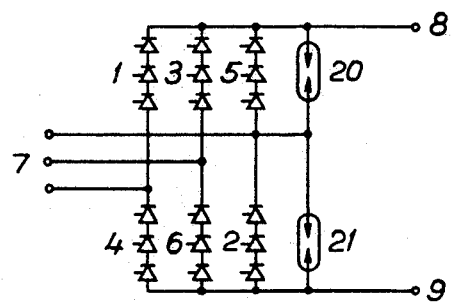
Figure 2:
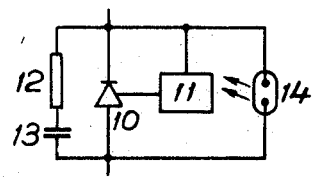
FIGURES 2–4 show different embodiments of thyristor protective means according to the invention.

FIGURE 2 shows in more detail one of the thyristors 10 in a thyristor rectifier witth corresponding auxiliary means. Between the control electrode and the cathode of the thyristor is inserted a control pulse device 11 which delivers control pulses to the thyristor. Between the anode and the cathode of the thyristor is inserted a part of a voltage divider for the thyristor rectifier comprising a resistor 12 and a capacitor 13. Similar resistors and capacitors are parallel connected to the different thyristors in the thyristor rectifier and together form a voltage divider for the whole thyristor rectifier. Further, the thyristor is parallel connected with a rapidly igniting protective spark gap 14 which mainly comprises a discharge tube with two electrodes and a gap which in some way is pre-ionised in order to secure rapid ignition. The control means 11 is of conventional design and is provided to deliver control pulses to the thyristor 10 with a certain delay angle in relation to the alternating voltage from the proper phase terminal of the AC terminals 7 in FIGURE 1. Besides this the control means 11 is provided with a photo-sensitive input circuit not shown, which input circuit is influenced from the radiation from the protective gap 14 when this is ignited. In this way a radiation from the ignited gap 14 will cause an ignition pulse to the thyristor 10 from the control means 11 so that the thyristor is ignited and takes over the current from the protective gap 14 provided that the over-voltage corresponds to the conducting direction of the thyristor.

Figure 3:
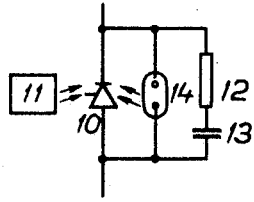

FIGURE 3 shows a connection according to the invention which is built up of so-called photo thyristors which can be ignited with light pulses directed against the semi-conductor body. The output circuit of the control means 11 is therefore made as a light source, the radiation of which causes ignition of the thyristor at the desired moment. In this case the radiation from the protective gap 14 is used directly for ignition of the thyristor which involves a simplification of the connection according to the invention as the control means 11 need not be provided with any special transmission circuit for the radiance from the protective gap 14. In this case the protective gap 14 must be so dimensioned that its radiation with the necessary security is sufficient to ignite the thyristor 10 without any amplification. Just as in FIGURE 2 the thyristor 10 is parallel-connected with voltage divider components 12 and 13.

Figure 4:
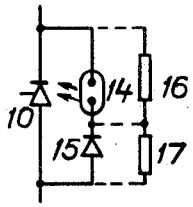

As mentioned earlier, the protective gap 14 should not normally ignite for over-voltages in the blocking direction of the thyristors as the thyristors are not able to take over such over-voltages from the protective gaps. In order to secure the gaps 14 the thyristor rectifiers could, as mentioned, be parallel connected with lightning arresters 20 and 21 as shown in FIGURE 1. Such lightning arresters are, as mentioned, not able to prevent ignition of some of the protective gaps in the case of local over-voltages. As seen from FIGURES 2 and 3 such local over-voltages, however, mainly cause discharging of the corresponding part of the voltage divider capacitor 13 which discharge is normally of such a short duration and has so little energy that it will not damage the proper protective gap. If it is desired under all circumstances to protect the spark gaps 14 against ignition from over-voltages in the blocking direction of the thyristor rectifier a diode 15 as shown in FIGURE 4 may be connected in series with each protective gap which diode must have the same conductive direction as the thyristors. In order to secure correct voltage division over the protective gaps 14 and the diodes 15 it may be necessary to insert an extra voltage divider 16–17 over both these components.

What is claimed is:

1. Thyristor rectifier for high voltage comprising a number of series connected thyristors characterised in that each thyristor in the thyristor rectifier is parallel connected with its own rapidly igniting protective spark gap and provided with a light sensitive control circuit controlled from the radiation from said spark gap.

2. Thyristor rectifier as claimed in claim 1, characterised in that the thyristors in said rectifier are photoconductive thyristors.

3. Thyristor rectifier as claimed in claim 1, characterised in that each of said spark gaps is connected in series with a diode, the conducting direction of which is the same as the conducting direction of the thyristor rectifier.

4. Thyristor rectifier as claimed in claim 3, characterised in that said series connected spark gap and diode are parallel connected with a voltage divider.

5. Thyristor rectifier as claimed in claim 1, characterised in that said thyristor rectifier is parallel connected with a protective discharge means, the flash-over voltage of which is less than the total of all said series connected protective spark gaps.

References Cited

UNITED STATES PATENTS

| 2,673,952 | 3/1954 | Hoover | 327—13 |
| 3,246,206 | 4/1966 | Chowdhuri | 307—202 X |
| 3,428,865 | 2/1969 | Opad | 317—31 |

JAMES W. LAWRENCE, Primary Examiner

E. R. LA ROCHE, Assistant Examiner

U.S. Cl. X.R.

315—151; 317—33; 321—11